United States Patent [19]

Flasza et al.

[11] Patent Number: 4,553,141

[45] Date of Patent: Nov. 12, 1985

[54] PICTURE CONTROL FOR RGB MONITOR

[75] Inventors: Michael D. Flasza, Schaumburg; David K. Nienaber, Des Plaines, both of Ill.

[73] Assignee: Zenith Electronics Corporation, Glenview, Ill.

[21] Appl. No.: 420,759

[22] Filed: Sep. 21, 1982

[51] Int. Cl.[4] .............................................. G09G 1/28
[52] U.S. Cl. ........................................ 340/703; 358/27
[58] Field of Search ................ 340/703, 701, 750; 358/27, 29, 21 R, 40

[56] References Cited

U.S. PATENT DOCUMENTS

| | | |
|---|---|---|
| 3,838,208 | 9/1974 | Fujiwara et al. ................... 358/29 |
| 3,927,346 | 12/1975 | Spannhake ........................... 358/29 |
| 4,086,579 | 4/1978 | Easter ................................... 340/722 |
| 4,180,805 | 12/1979 | Burson ................................. 340/750 |
| 4,348,688 | 9/1982 | Ainscow .............................. 358/29 |
| 4,450,439 | 5/1984 | Kobayashi ........................... 340/745 |

*Primary Examiner*—Marshall M. Curtis

[57] ABSTRACT

A color monitor includes R G and B gain blocks, in the form of balanced multipliers, and a potentiometer picture control for supplying a common DC gain control voltage to the differentially coupled transistor pairs in the gain blocks. A common black level control adjusts the zero level for the signals. Changes in gain control voltage do not affect black level or color balance of the picture tube display.

10 Claims, 1 Drawing Figure

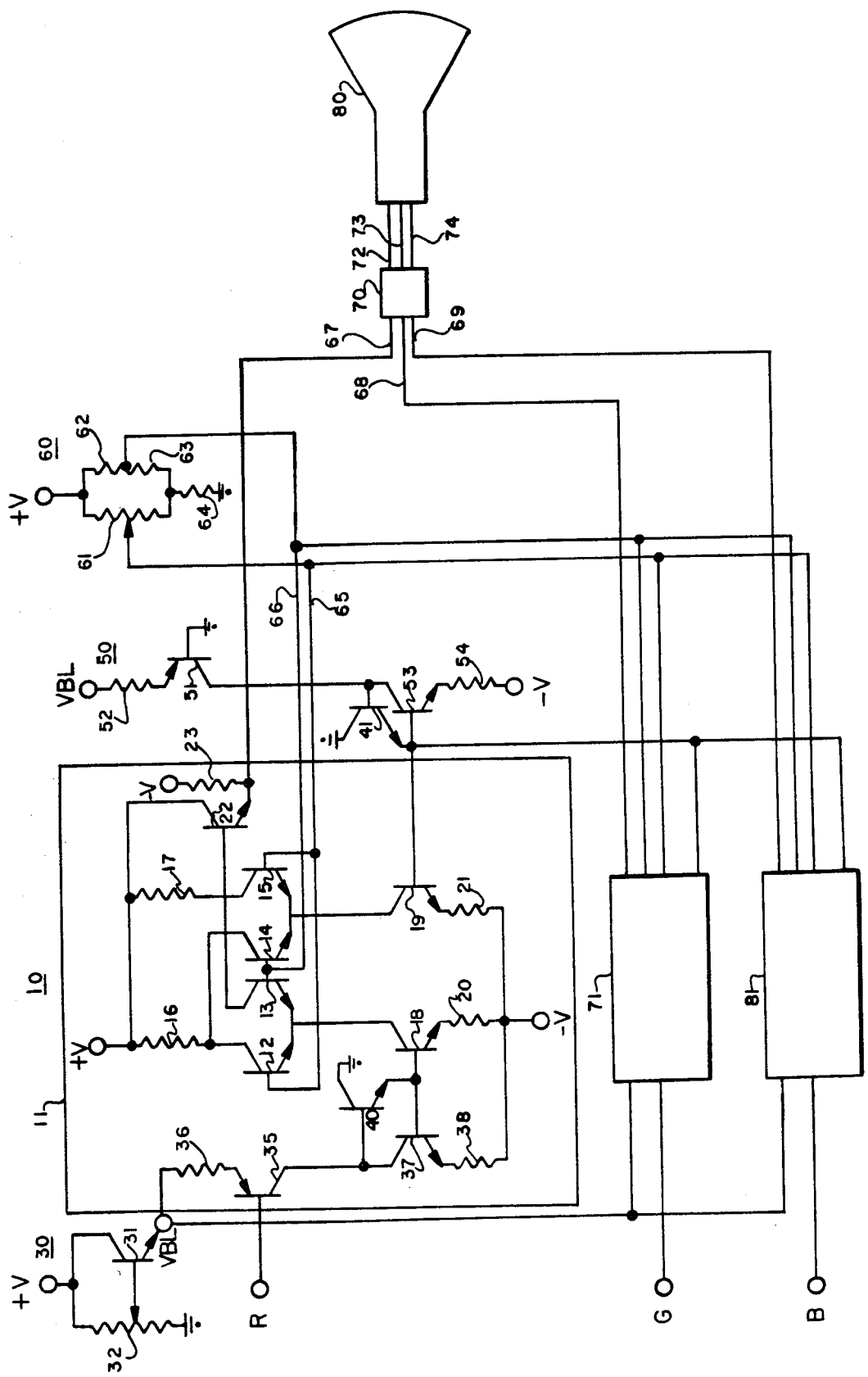

PICTURE CONTROL FOR RGB MONITOR

BACKGROUND OF THE INVENTION

This invention relates to color monitors adapted to receive analog R, G and B color input signals.

The market for television monitors has grown rapidly with the proliferation of computers and computer terminals. A monitor is simply a television receiver without a tuner and associated signal processing circuits required to receive, demodulate and process transmitted television signals. The monitor directly accepts video information and applies it to a picture tube. Most monitors are monochrome, that is, they only accept monochrome signals and include picture tubes having faceplates covered with a single type light-emitting phosphor, rather than different colored light-emitting phosphors. While the particular phosphor may produce colored light (such as green or blue) the entire display is monochromatic.

Color monitors are desirable because of their greater ability to present meaningful information. They are, of course, more complex, requiring individual color signal channels and a color picture tube capable of generating different colored light outputs in response to appropriate color signal inputs. Few user controls, other than a brightness control for regulating the amount of light emitted from the display, are required. A brightness control on a monochrome monitor is simple to incorporate. Putting a brightness control on a color monitor is more complicated because of the relationship between the primary colors, which determines the color balance of the display, and the need to maintain proper color saturation with changes in contrast and brightness of the display.

The television industry has over many years developed all types of controls for adjusting picture brightness, contrast, color saturation, hue, tint, etc. The consensus appears to be that, in addition to color saturation and tint controls, a black level control and a so-called picture control, the latter for adjusting color amplitude and picture contrast together, are most suited for producing pleasing displays.

In a conventional color television receiver, wideband brightness information and narrow band color difference information are processed in separate luminance and chrominance channels and subsequently matrixed to form the red, green and blue (RGB) color signals applied to the color picture tube. The wide band luminance signal may be separately controlled to affect black level, brightness and contrast and the narrow band chrominance signals are similarly controlled to affect color level and tint.

Color monitors however, may not have separate chrominance channel and luminance channel inputs. Rather, wideband R G and B color signals are supplied as inputs. The problem of providing black level and picture controls for wideband R G B signals is substantial. There have been very simple controls provided for monitors capable of accepting digital R G B color signals, but even these results are very limited in terms of the range of colors available. The manner of application of those simple controls to color monitors adapted to receive R G B analog signals is not apparent.

OBJECTS OF THE INVENTION

The principal object of this invention is to provide an improved color monitor.

Another object of this invention is to provide an economical color monitor having user operated picture and black level controls.

SUMMARY OF THE INVENTION

In accordance with the invention, a color monitor includes a color picture tube producing a display having color balance and black level determined by the amplitudes of input color signals, each of which signals include both chrominance information and luminance information, and color signal translation means having a plurality of inputs for receiving the input color signals and a plurality of outputs for supplying the translated color signals to the picture tube, a plurality of matched gain blocks for amplifying the color signals and picture control means for applying a common gain control voltage to the gain blocks for simultaneously adjusting the levels of the translated color signals without upsetting the color balance and black level of the display.

BRIEF DESCRIPTION OF THE DRAWING

Other objects and advantages of this invention will be apparent by reading the following description thereof in conjunction with the drawing in which the single FIGURE represents a partial schematic, partial block diagram of a color monitor embodying the teachings of the invention.

DESCRIPTION OF THE PREFERRED EMBODIMENT

Referring to the drawing, color signal translation means 10 includes three inputs R, G and B for receiving red, green and blue color signals, translating the signals and supplying the translated color signals to the input of a color picture tube 80.

Conventional circuit arrangements for supplying appropriate operating voltages for the circuits and for the color means 10 include a plurality of gain blocks 11, 71, and 81. While only one gain block (11) is shown in detail, it will be understood that the other gain blocks (71 and 81) are identical in configuration. It will also be understood that conventional mechanical supports, cabinets, mounting hardware and the like are also omitted from the description.

The input color signals are supplied to the gain blocks at terminals R G and B and their outputs, comprising translated R G and B color signals, are applied on lines 67, 68, and 69 to the inputs of a conventional three-color amplifier 70 where they are further amplified and supplied over leads 72, 73 and 74 to the input of picture tube 80.

A circuit 30 functions as a black level control for adjusting the black level signal voltage for all of the gain blocks. A circuit 50 comprises a bias source for supplying bias to one set of current mirrors in the gain blocks and a circuit 60 comprises picture control means for applying a common DC gain control voltage to all of the gain blocks for simultaneously and uniformly affecting translation of the R, G and B signals.

Referring in more detail to gain block 11, a first pair of NPN transistors 12 and 13 are arranged in a differentially coupled manner with a second pair of NPN transistors 14 and 15. The collector electrodes of transistors 12 and 14 are arranged in parallel and connected through a load resistor 16 to a source of positive voltage +V. Similarly the electrodes of transistors 13 and 15 are arranged in parallel and connected through a load resistor 17 to potential source +V. The emitter electrodes of transistors 12 and 13 are connected together, as are the emitter electrodes of transistors 14 and 15. An NPN output transistor 22 has its collector electrode connected to +V, its base electrode connected to the collector of transistors 13 and 15 and its emitter electrode coupled to a source of negative potential −V through a load resistor 23. The junction of the emitter of transistor 22 and a load resistor 23 constitutes the output of the R gain block (11) and the translated R signal appears on lead 67 connected to the input of amplifier 70. The bases of transistors 12 and 15 are connected together and to a lead 65. Similarly a lead 66 is connected to the bases of transistors 13 and 14.

A pair of current mirrors are provided for the differentially coupled transistors. An NPN transistor 18, having a collector electrode connected to the emitters of transistors 12 and 13 is part of one current mirror and an NPN transistor 19, having a collector electrode connected to the emitters of transistors 14 and 15, is part of the other current mirror. The emitter electrodes of transistors 18 and 19 are connected, through respective load resistors 20 and 21, to −V. Those skilled in the art will recognize the above described circuit as a balanced multiplier. It can be shown that changes in the voltage applied between leads 65 and 66 to the bases of the differentially coupled transistors produce no net change in either the load current or output voltage of the transistors if the collector currents of transistors 18 and 19 are equal. This characteristic of a balanced multiplier makes it very useful in the circuit of the invention for an RGB picture control.

Ignoring black level control 30 for the moment, it will be seen that the input signal applied to terminal R is supplied to the base electrode of a PNP transistor 35 having a resistor 36 coupled between its emitter electrode and a terminal VBL. The collector electrode of transistor 35 is connected in series with the collector electrode of an NPN transistor 37 having an emitter electrode coupled through a resistor 38 to −V. The base electrode of transistor 37 is connected to the base of transistor 18 and it will be seen that transistor 37 is part of the current mirror that includes transistor 18. Assuming for the moment that the collector of transistor 37 is connected directly to its base, (in effect making transistor 37 a diode) the function of transistor 35 is thus seen to be that of converting a voltage input signal R into a current mode signal for transistor 18. Transistor 37, transistor 18 and, as will be seen, transistor 40 translate the current mode signal for changing the conduction current in differentially coupled transistors 12 and 13.

Bias circuit 50 includes a PNP transistor 51 having an emitter electrode connected through a resistor 52 to terminal VBL (black level voltage), a base electrode connected to ground and a collector electrode connected to the collector electrode of an NPN transistor 53 and to the base electrode of an NPN transistor 41. Transistor 53 has an emitter electrode connected to −V through a resistor 54 and a base electrode connected to the base of transistor 19 and to the emitter of transistor 41. The collector electrode of transistor 41 is connected to ground. Assuming for the moment that transistor 41 functions to provide a direct connection between the collector and base of transistor 53, the similarity to transistor 37 is seen and transistor 53 and transistor 19 form part of the other current mirror in gain block 11.

Transistor 40 thus helps to supply bias current for transistor 37 and for transistor 18 which eliminates the need for transistor 35 to supply that current. Corresponding transistor arrangements are found in each of the other gain blocks. The other current mirror in each gain block is supplied bias current by transistors 52, 53 and 41, which are common to all gain blocks.

Picture control means 60 consists of a network including a potentiometer 61 and resistors 62, 63 and 64 connected between +V and ground. Specifically, potentiometer 61 is connected in parallel with serially connected resistors 62 and 63 and the parallel combination is connected between +V and a resistor 64 which, in turn, is connected to ground. The slider on the potentiometer is connected to lead 65 and the junction of resistors 62 and 63 is connected to lead 66. Movement of the slider effects a change in the DC potential between lead 65 and 66 which is the steering voltage for the emitters of the differentially coupled transistor pairs and the DC gain control voltage for the gain block.

The source of the black level control voltage VBL comprises an NPN transistor 31 having a collector electrode connected to +V, an emitter electrode connected to terminal VBL and a base electrode connected to the slider of a potentiometer 32 connected between +V and ground. As the slider is moved, conduction in transistor 31 is varied and the DC potential of terminal VBL is changed. VBL is connected to each of the gain blocks 11, 71 and 81 and determines the quiescent DC bias current (and, therefore the output level) in the absence of an R, G, or B input and may therefore be used as a black level control voltage. The actual black level potential is a function of the picture tube cut off characteristics. Thus the black level voltage will be set at the cut off voltage of the picture tube and will be attained when the individual red, green and blue color signals go to zero.

The DC gain control potential on lines 65 and 66 from picture control 60 is coupled to gain blocks 71 and 81 as well as to gain block 11 and functions in the same manner to control the G and B signals. Thus amplifier 70 receives three color signals on leads 67, 68 and 69 which signals are amplified and applied over leads 72, 73 and 74 to color picture tube 80.

Preferably gain blocks 11, 71 and 81 are fabricated in integrated circuit form along with bias 50 and black level control 30. As is well known, integrated circuit technology enables precise matching of transistors and components and greatly facilitates the implementation of the invention which requires matched gain blocks for optimum operation.

With the invention the color balance of the display on picture tube 80 which, as is well known, is determined by the relative ratios of R G and B signals presented to the picture tube, is retained, despite variations in picture control settings. Further, the black level set for the monitor is not altered either during or as a result of changes or adjustments in the picture control. Therefore the display presented to the viewer is optimized with the black level in the display being retained and the contrast (or drive level) of the display being determined by the picture control setting while overall color balance is maintained. The viewer may also be provided with an additional control for changing the black level setting to satisfy his own viewing preferences.

As mentioned above, the R G and B signal inputs are wideband. The gain control voltage developed by the picture control 60, is seen to be DC. Therefore the picture control is not particularly sensitive to its location in the color monitor or to the length of leads connecting it to the gain blocks. This gives the manufacturer greater design freedom by enabling the picture control to be conveniently positioned in the monitor without the need for expensive mechanical linkages because the gain control voltage is not frequency sensitive.

What has been described is a novel color monitor having a picture control for adjusting the display on the monitor without upsetting color balance or black level. It is recognized that those skilled in the art will perceive numerous modifications and changes in the particular arrangement used to embody the invention without departing from its true spirit and scope and that the invention is to be limited only as defined in the claims.

We claim:

1. A color monitor for developing a color display in response to input R G and B color signals, each of which color signals includes both chrominance information and luminance information, said display being produced by a color picture tube and exhibiting color balance and color black level determined by the amplitude of said input color signals and the characteristics of said color picture tube, comprising:
    a plurality of inputs for receiving said input color signals and a corresponding plurality of outputs for supplying said color signals to said picture tube;
    a plurality of matched gain blocks coupled between said inputs and said outputs for amplifying said color signals, each said gain block including balanced multiplier means for enabling simultaneous control of the levels of said color signals in said gain blocks without upsetting said color balance and said black level of said display; and
    picture control means applying a common gain control voltage to said gain blocks.

2. A color monitor as set forth in claim 1 wherein said picture control means includes a potentiometer.

3. A color monitor as set forth in claim 2 wherein said gain control voltage is a DC potential.

4. A color monitor as set forth in claim 3 wherein said balanced multiplier means each include balanced differentially coupled transistors.

5. A color monitor as set forth in claim 4 further including:
    a common black level control for varying the voltage corresponding to zero level of said color signals.

6. A color monitor as set forth in claim 5 wherein each of said gain blocks further includes a pair of current mirrors, one current mirror in each said pair coupling a respective one of said input color signals to said balanced differentially coupled transistors.

7. A color monitor as set forth in claim 6 further including:
    a common bias source supplying bias current to the other current mirror of each said pair in said gain blocks.

8. A color monitor for developing a color display from input R G and B color signals, on a color picture tube, said display exhibiting a color balance and black level determined by the amplitudes of said input R G and B color signals and the characteristics of said picture tube, comprising:
    a plurality of inputs for receiving said input R G and B color signals and a corresponding plurality of outputs for supplying said R G and B color signals to said picture tube;
    a plurality of matched gain blocks, each including balanced multiplier means comprising balanced differentially coupled transistors for simultaneously changing the levels of said R G and B color signals in response to a common DC gain control voltage without upsetting said color balance and said black level of said display; and
    picture control means including a potentiometer for applying a common DC gain control voltage to each of said gain blocks.

9. A color monitor as set forth in claim 8 further including:
    a common DC black level control for setting the voltage corresponding to zero signal level of said R G and B color signals.

10. A color signal monitor as set forth in claim 9 wherein each said gain block includes a first current mirror coupled to a respective one of said inputs and a second current mirror; and
    common bias means supplying bias current to said second current mirrors.

* * * * *